(12) United States Patent
Cheng et al.

(10) Patent No.: US 10,367,655 B2
(45) Date of Patent: Jul. 30, 2019

(54) NETWORK SYSTEM AND METHOD FOR CONNECTING A PRIVATE NETWORK WITH A VIRTUAL PRIVATE NETWORK

(71) Applicant: Alibaba Group Holding Limited, Grand Cayman (KY)

(72) Inventors: Gang Cheng, Bellevue, WA (US); Shunmin Zhu, Hangzhou (CN); Jiesheng Wu, Redmond, WA (US); Rong Wen, Hangzhou (CN)

(73) Assignee: Alibaba Group Holding Limited, Cayman Islands (KY)

( * ) Notice: Subject to any disclaimer, the term of this patent is extended or adjusted under 35 U.S.C. 154(b) by 0 days.

(21) Appl. No.: 15/005,613

(22) Filed: Jan. 25, 2016

(65) Prior Publication Data
US 2017/0214545 A1    Jul. 27, 2017

(51) Int. Cl.
*H04L 12/46* (2006.01)
*H04L 12/803* (2013.01)

(52) U.S. Cl.
CPC ........ *H04L 12/462* (2013.01); *H04L 12/4633* (2013.01); *H04L 12/4641* (2013.01); *H04L 47/125* (2013.01)

(58) Field of Classification Search
CPC .............. H04L 12/462; H04L 67/1031; H04L 12/4641; H04L 67/1021
See application file for complete search history.

(56) References Cited

U.S. PATENT DOCUMENTS

| 6,219,349 | B1 | 4/2001 | Kobayashi et al. | |
|---|---|---|---|---|
| 7,792,021 | B1 * | 9/2010 | Pankajakshan | H04L 45/02 370/229 |
| 8,958,293 | B1 | 2/2015 | Anderson | |
| 9,306,837 | B1 | 4/2016 | Jain et al. | |
| 9,521,053 | B1 * | 12/2016 | Chen | H04L 43/08 |
| 2008/0031263 | A1 * | 2/2008 | Ervin | H04L 12/4641 370/397 |
| 2011/0261828 | A1 | 10/2011 | Smith | |
| 2013/0036213 | A1 * | 2/2013 | Hasan | H04L 67/1097 709/223 |

(Continued)

FOREIGN PATENT DOCUMENTS

| WO | WO2013174096 | 11/2013 |
|---|---|---|
| WO | WO2014152242 | 9/2014 |

OTHER PUBLICATIONS

International Search Report for PCT/CN2016/085849 dated Mar. 1, 2017, 2 pages.

(Continued)

*Primary Examiner* — Peter P Chau
(74) *Attorney, Agent, or Firm* — Lee & Hayes, P.C.

(57) ABSTRACT

A networking method including receiving, at an edge router of a cloud data center, a virtual private cloud ("VPC") network communication from a private network via a dedicated physical connection line to the edge router. The VPC network communication is forwarded to a gateway hardware group via a first connection using Virtual Extensible Local Area Network ("VXLAN") technology. The VPC network communication is then forwarded from the gateway hardware group to VPC of a user of the private network via a second connection using VXLAN technology to access a virtual machine ("VM").

10 Claims, 6 Drawing Sheets

(56) References Cited

U.S. PATENT DOCUMENTS

| | | |
|---|---|---|
| 2015/0098320 A1 | 4/2015 | Natarajan et al. |
| 2015/0106489 A1* | 4/2015 | Duggirala ............ H04L 61/2503 709/222 |
| 2016/0124742 A1* | 5/2016 | Rangasamy ............ H04L 47/70 717/103 |
| 2016/0127254 A1* | 5/2016 | Kumar .................... H04L 47/70 709/226 |
| 2016/0127454 A1* | 5/2016 | Maheshwari ........... H04L 47/70 709/223 |
| 2016/0149758 A1 | 5/2016 | Kinoshita et al. |
| 2016/0308762 A1* | 10/2016 | Teng ........................ H04L 45/50 |
| 2016/0337175 A1* | 11/2016 | Rao ......................... H04L 49/25 |
| 2016/0337179 A1* | 11/2016 | Rao ......................... H04L 49/25 |
| 2016/0337180 A1* | 11/2016 | Rao ......................... H04L 49/25 |
| 2016/0337193 A1* | 11/2016 | Rao ......................... H04L 49/25 |
| 2016/0337473 A1* | 11/2016 | Rao ......................... H04L 49/25 |
| 2016/0337474 A1* | 11/2016 | Rao ......................... H04L 49/25 |
| 2016/0353325 A1* | 12/2016 | Poikonen ............ H04L 41/0246 |

OTHER PUBLICATIONS

Office Action for U.S. Appl. No. 15/113,806, dated Mar. 21, 2019, Cheng, "Network System and for Cross Region Virtual Private Network Peering", 13 pages.

* cited by examiner

US 10,367,655 B2

NETWORK SYSTEM AND METHOD FOR CONNECTING A PRIVATE NETWORK WITH A VIRTUAL PRIVATE NETWORK

CROSS REFERENCE TO RELATED PATENT APPLICATIONS

This Application is related to U.S. patent application Ser. No. 15/113,806 filed on Jul. 22, 2016, entitled "NETWORK SYSTEM AND METHOD FOR CROSS REGION VIRTUAL PRIVATE NETWORK PEERING" and PCT Application PCT/CN2016/085849 filed Jun. 15, 2016, entitled "NETWORK SYSTEM AND METHOD FOR CROSS REGION VIRTUAL PRIVATE NETWORK PEERING", hereby incorporated by reference.

BACKGROUND

As companies and corporations grow, one of the most challenging aspects of modern business is effective management of the ever-changing technology scene. This aspect of management may be affected by the changes in at least three ways.

First, computing and software advancements are accelerating at a rapid rate. These advancements often provide more convenience to users, increased speed of transactions and processes, and greater effectiveness of business related functions generally. As such, to have any of the aforementioned benefits would be valuable to almost any business that wants to succeed because that is what the customer expects and it is in the business' best interest to try to fulfill that expectation. Unfortunately, while these benefits may appear appealing to a business, they also come with an increasing cost. Forefront technology tends to be available for a premium price, which may not be readily attainable for many businesses to implement, particularly on a frequently revolving basis, due to the sheer quantity of products a business may need to purchase if all parts and employees are to receive upgrades to the advanced technology.

Second, the workplace scene itself is changing in the ways and, particularly, the locations, that the technology is being used. For example, as the markets for a business' products or services expands between nations and even worldwide, the end-users of the technology may have the need to access or bring the technology and associated business information with them to wherever the business has needs around the world. Additionally, many end-users have needs, either part-time or full-time, for which access to business information and technology is available at home.

Third, as businesses expand to faraway markets and end-users are removed from the privacy and security of a localized, in-house private network, the reliability of securely and timely accessing business information becomes an increasingly important aspect of maintaining a quality business.

Accordingly, in an effort to address the issues discussed above, many businesses are turning from in-house IT to Virtual Private Cloud (VPC) networks. A VPC has been described as an external IT resource of an on demand configurable pool of shared computing resources allocated within a public cloud environment, providing a certain level of isolation between the different businesses or organizations using the resources. Thus, instead of individual businesses needing to constantly update internal resources or pay additional employees to maintain the equipment, the burden may be shifted to the VPC host and shared by many businesses. Additionally, the VPC may be accessible from anywhere with connection availability.

While the use of VPCs is not necessarily new of itself, there are a myriad of ways in which end users may connect with a VPC.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
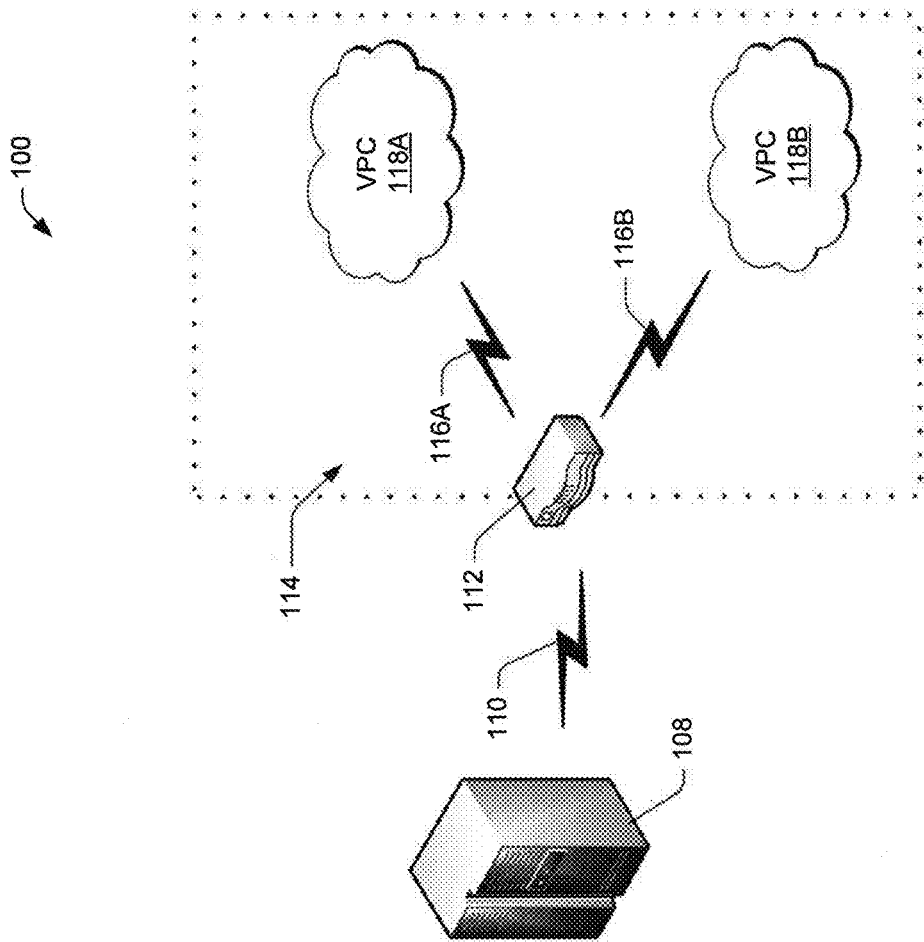
FIG. 1 illustrates a network architecture according to an example embodiment of this application.

This disclosure is directed to providing a secure, reliable, and easily scalable Virtual Private Cloud network ("VPC") for connection with a private network. In particular, the VPC is made accessible to the private network via a scalable system of gateway hardware. Furthermore, the network traffic is transmitted from a cloud data center's edge router to the gateway hardware using Virtual Extensible Local Area Network tunneling technology ("VXLAN").

From a user's perspective, one potential difference of using VXLAN tunneling technology instead of conventional means may be noticed in data transmission consistency and speed of the connection due to reduced bottlenecking of data at the improved scalable gateway hardware. Visually, however, the actual means of access may appear the same to the user as if using conventional means.

For comparison purposes only, the following paragraph describes one example of the conventional means used by end-users to connect to a VPC. In particular, an end-user may set up a connection from a private network on the user's premises to a service provider. The service provider may then set up a connection, (e.g., physical connection or logical connection) using a Virtual Local Area Network ("VLAN") with the customer switch ("CSW")) of a cloud data center service provider. The CSW is also referred to herein below as the "edge router" of the cloud data center. Alternatively, the end-user may set up a direct connection to the edge router. At the edge router, an instance of Virtual Routing and Forwarding ("VRF") is created for each end-user on the CSW. Next, using a Generic Routing Encapsulation ("GRE") tunneling technology, or perhaps Internet Protocol Security ("IPsec technology,") a virtual machine ("VM") instance gateway is created inside the VPC to connect the VPC with the VRF. Finally, the end-user network traffic is distributed to VMs in the VPC via the VM gateway.

One example of the limitations of the above-described conventional means includes the fact that GRE and IPsec tunnels are used for connecting the user VRF to the VM gateway. Since GRE and IPsec tunnels are layer 3 over layer 3 tunneling protocols, such a network connection cannot support layer 2 based applications between the end-user's private network and the VPC. Furthermore, the use of a GRE or IPsec tunnel between the VRF and the VM gateway creates a problem that the traffic load for one end-user cannot be balanced in transmission between the VRF and the VM gateway. An additional limitation is that the gateway resides inside the VPC and the gateway is not a multi-user gateway. As such, the conventional means cannot leverage the possibility of allowing multiple end-users to share one gateway to reduce the cost and improve user satisfaction.

An alternative conventional means is simply connecting a private network entirely over the public internet, with or without an IPsec tunnel, to a VPC. However, low performance is often experienced due to unpredictable bandwidth and unreliable security, which creates a risk of compromised information.

In contrast, the network system architecture of the instant application improves on the conventional means for various reasons described herein below. In general, an end-user may connect to a desired VPC by the instant network as follows. Specifically, end-users may connect a private network to the service provider, using a tunneling technology from one of the following: Multiprotocol Label Switching/Label-Switched Path ("MPLS/LSP"), Virtual Private Network ("VPN"), VXLAN, or GRE technologies. From there, the service provider may connect to the edge router of the cloud data service center (or CSW) via VLAN. For the purposes of this application, end-user network traffic that is intended to reach a VPC may also be referred to herein as VPC network communication.

Once the VPC network communication is routed to the edge router of the cloud data service center, a single instance of VRF is created per single end-user. This single instance of VRF connects to one or more VLANs which belong to same end-user. Note, for clarity, the term "end-user" as discussed herein may refer to a group or company of multiple users on multiple respective VLANs. From the edge router of the cloud data center, VXLAN tunneling technology is used to route the end-user's network traffic to a gateway. In particular, this gateway is referred to herein as the gateway hardware group. Furthermore, this gateway hardware group is a default gateway for the VMs of the end-user's VPC.

After reaching the gateway hardware group, the end-user network traffic including VPC network communication is forwarded from the gateway hardware group to the user's VM(s) in the user's VPC. Again, this connection for forwarding network traffic from the gateway hardware group uses a VXLAN tunnel that is specific to the individual end-user. Due to the unique network configuration of an embodiment of the instant application, in instances where a single end-user owns a plurality of VPCs in the public cloud data center, the end-user has the ability to interconnect to all of the VPCs owned by the end-user with a only a single instance of connection to the edge router of the data cloud center. This may be possible, at least in part, because the edge router of the cloud data center creates different VXLAN tunnel for each individual VPC at the time the VPC network communication is forwarded to the gateway hardware group.

Additionally, a situation may exist where a single end-user desires to connect to multiple VPCs owned by the end-user, which VPCs are located in different regions or availability zones where, for example, different gateway hardware groups are tasked with forwarding the network traffic to the different VPCs, respectively. In such a situation, different VXLAN tunnels with different endpoints at the various VPCs are created to forward user traffic to different regions or availability zones.

Accordingly, VXLAN tunneling technology is implemented herein because it is more effective in transmitting large amounts of network traffic that is balanced between the multiple gateway hardware server devices of the gateway hardware group. In particular, it handles layer 2 traffic and packet information is packaged via hardware encapsulation.

Illustrative Embodiments of Network Architecture

The network architecture 100 depicted in FIG. 1 includes a representation of a company 102 with end-users 104 using a private network connected to a virtual network. The company 102 may have IT needs that cannot be met easily within the company's available resources, or perhaps, the company 102 may prefer to rely on external IT support. To this end, the private network of company 102 may be connected via a connection 106 to a service provider 108. For added security, connection 106 may include a dedicated physical connection line. Additionally, even though a logical connection line may provide a less secure connection from the company 102 to the service provider 108, connection 106 may alternatively be a logical connection line.

In FIG. 1, service provider 108 is further directly connected via a connection 110 to an edge router 112 of a cloud data center 114. The direct connection 110 from the service provider 108 to the edge router 112 of the cloud data center 114 may be a dedicated physical connection line for greater security in protecting the transmission of the data of the private network. The edge router 112 may alternatively be referred to as a customer cloud access switch ("CSW"). In some instances, for a single end-user 104, a single instance of Virtual Routing and Forwarding ("VRF") is created on the CSW. With this single instance of VRF, the end-user may connect to one or more VPCs, assuming each VPC belongs to the same end-user.

In general, the network traffic of the private network is then routed from edge router 112 via a connection 116A, 116B to the appropriate VPC 118A, 118B. Each VPC 118A, 118B may be logically separated. However, in some instances, an end-user 104 may have prior rights/authorizations to be permitted to connect to both a first VPC 118A and a second VPC 118B. For example, where company 102 owns both VPC 118A and VPC 118B. The cloud data center 114 is discussed in greater detail herein below.

In one embodiment, connections 116A, 116B forward network traffic data from the edge router 112 to the VPCs 118A, 118B using VXLAN tunneling technology. VXLAN is used herein because of the superior technology compared to GRE tunneling technology, which cannot support layer 2 based applications between the end-users and the VPCs.

Figure 2:
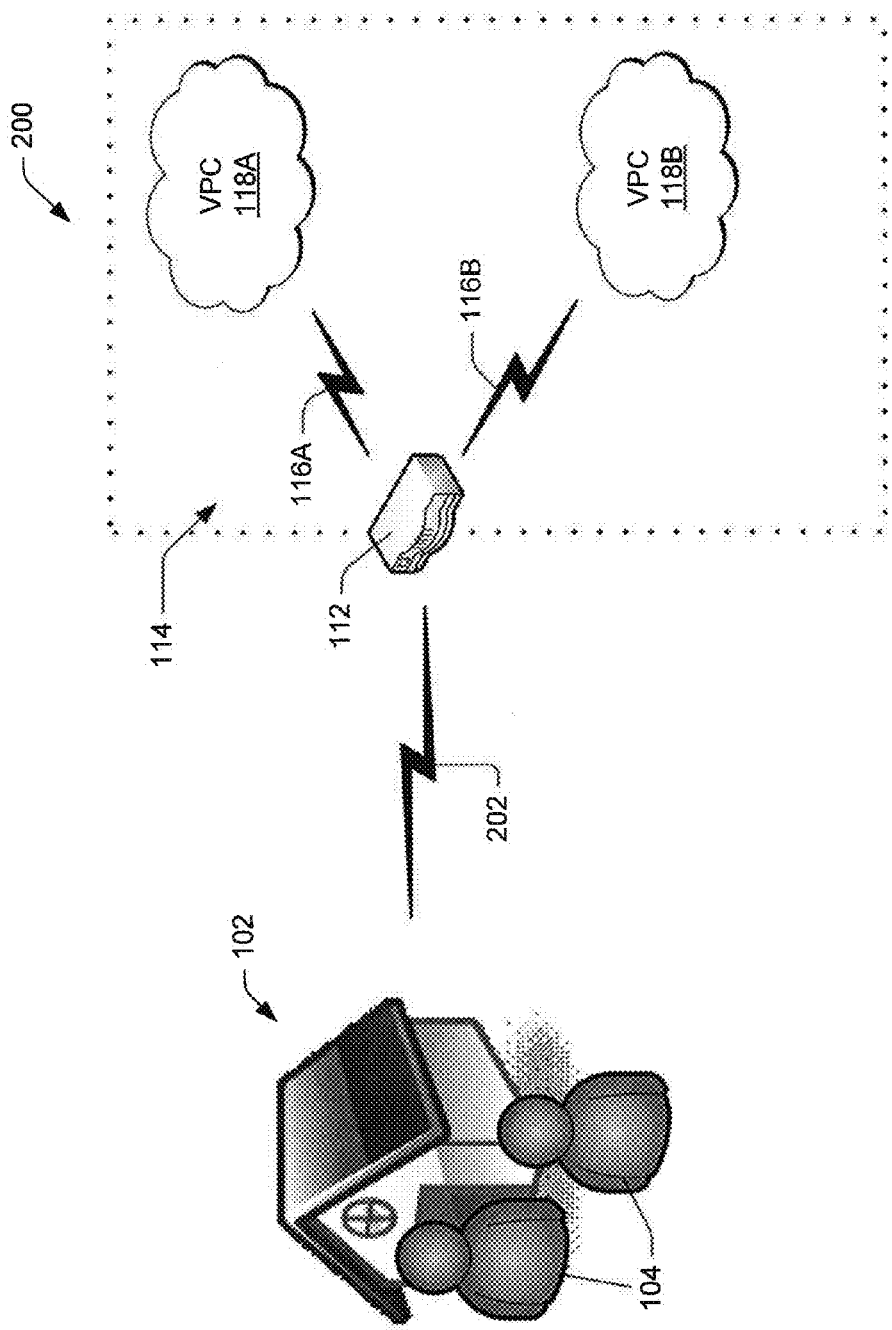
FIG. 2 illustrates a network architecture according to an example embodiment of this application.

As illustrated by the network architecture 200 in FIG. 2, the company 102 bypasses a service provider and instead is directly connected to the edge router 112 of the cloud data center 114 via connection 202. Here again, the direct connection 202 may be a dedicated physical connection line for greater security. This may occur, for example, where the company 102 is sufficiently close to the cloud data center 114 such that the cost of going first through a service provider, and then still obtaining a physical connection line to connect from the service provider to the edge router 112 is prohibitive or at least greater than the cost of simply adding a direct physical connection line 202. Like the network architecture 100, once the network traffic of the network architecture 200 reaches edge router 112 of the cloud data center 114, the further connection between the edge router 112 and one or more VPCs (such as VPCs 118A, 118B), is the same connection(s) 116A, 116B, as was in FIG. 1. Further details regarding connections 116A, 116B are provided below.

Illustrative Embodiments of Cloud Data Center Network Infrastructure

Figure 3:
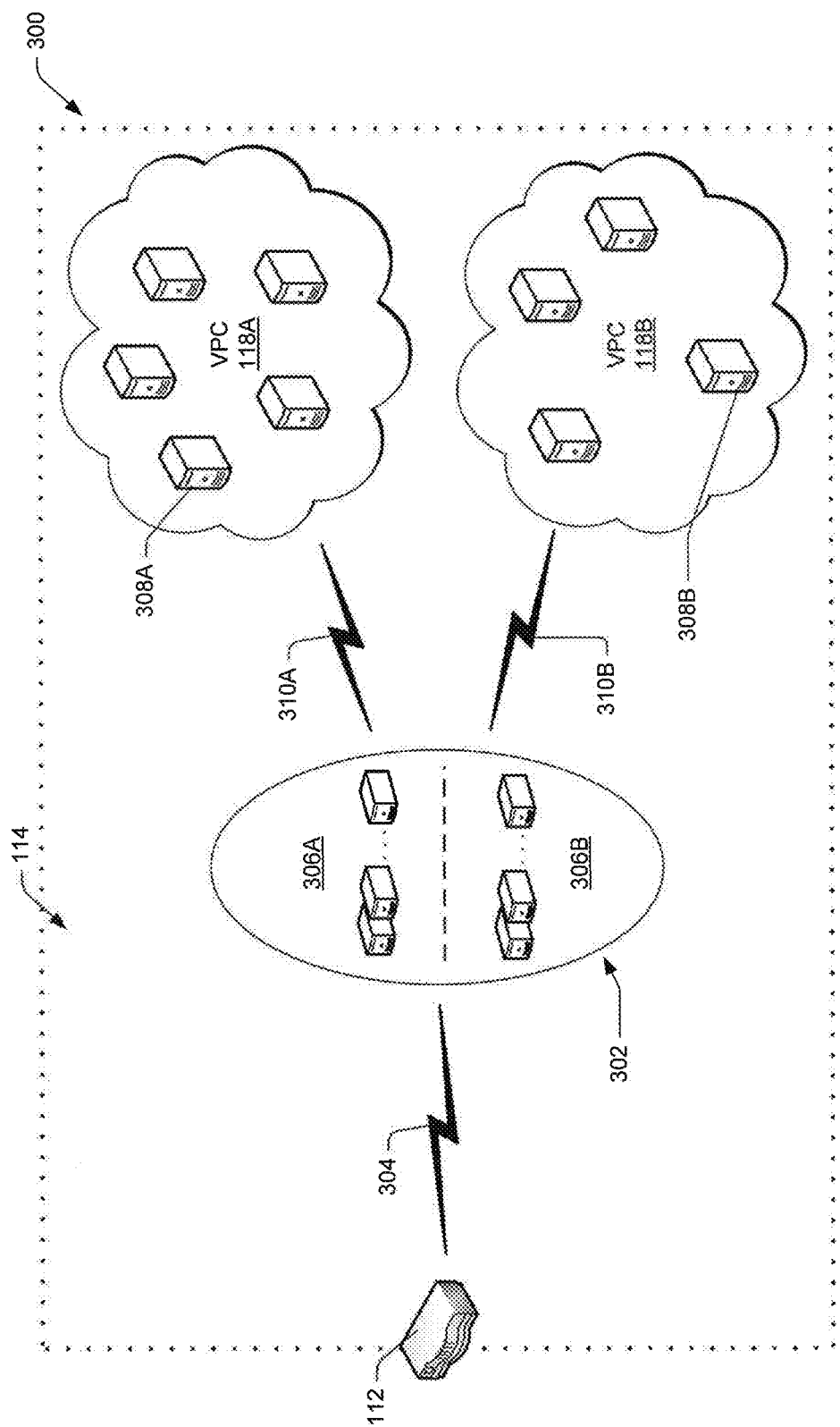
FIG. 3 illustrates additional detail of network architecture according to an example embodiment of this application.

In FIG. 3, an embodiment of the cloud data center network infrastructure 300 is depicted. In particular, network infrastructure 300 includes the cloud data center 114. Access to the cloud data center 114 may be gained via the edge router 112, as discussed above either directly (see FIG. 2) or indirectly (see FIG. 1). However, FIG. 3 shows that connections 116A, 116B of FIGS. 1 and 2 may further include a gateway hardware group 302 connected to the edge router 112 via connection 304. Connection 304 implements VXLAN tunneling technology in forwarding the network traffic to the gateway hardware group.

The gateway hardware group 302 is implemented to sort and balance the network traffic load before arriving at one or both of VPCs 118A, 118B. The gateway hardware group 302 may include one or more gateway server subgroups 306A, 306B. Each gateway server subgroup 306A, 306B may include one or more gateway servers as depicted, among which the network traffic load may be distributed and balanced. Furthermore, each gateway server subgroup 306A, 306B may be tasked to support a single VPC (118A, 118B) containing one or more virtual machines ("VM") 308A, 308B. The connection(s) 310A, 310B between a gateway server subgroup 306A, 306B and VPCs 118A, 118B are also performed using VXLAN tunneling technology.

Despite each gateway server subgroup 306A, 306B being tasked to a single VPC, the dashed dividing line in FIG. 3 that segregates subgroups 306A, 306B signifies that subgroups may still be communicatively coupled to other subgroups in the cloud data center 114. As such, if at any time the network traffic load becomes too great to be supported by a single gateway server subgroup, there is an immediate option to balance the load by redistribution among other underutilized subgroups. This balancing may occur by intercommunication between the overburdened subgroup and the underutilized subgroup. Additionally, as a more long-term solution, the gateway hardware group 302 is easily scalable such that one or more additional gateway servers can simply be added to a subgroup to ease the network flow by balancing the traffic load among the increased number of gateway servers in the subgroup.

It is notable that the servers used for the gateway hardware are robust and designed to manage network traffic using VXLAN technology.

Figure 4:
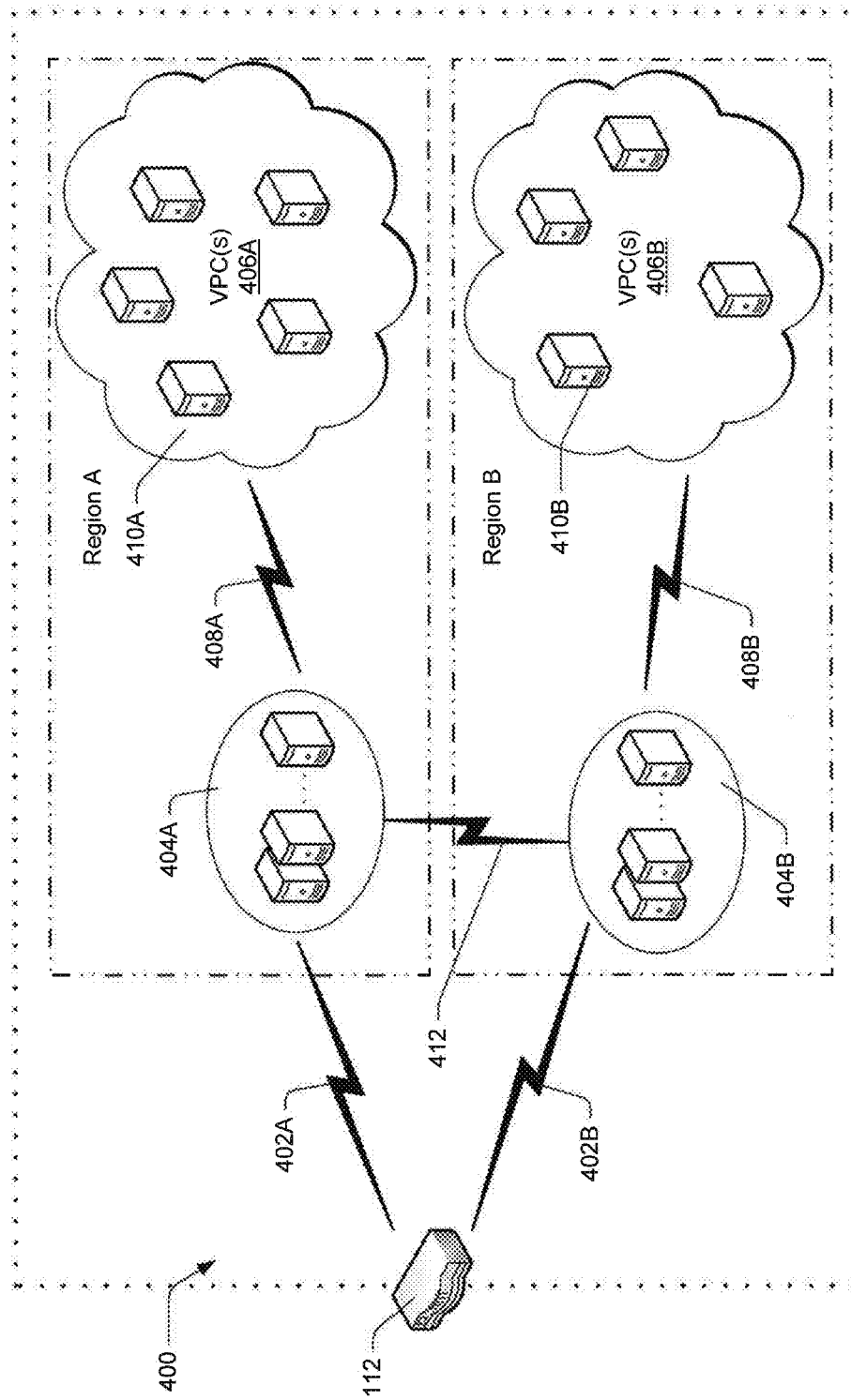
FIG. 4 illustrates additional detail of network architecture according to an example embodiment of this application.

FIG. 4 presents another situation that may arise in cloud computing, which is that a cloud computing provider may manage a cloud data center 400 that includes VPCs across multiple regions, such as Region A and Region B. An end-user (e.g., end-user 104 in FIG. 1) may desire to have data be stored in a particular location, or the end-user may not have a preference at all, and the data may simply be stored in another non-local region (i.e., not local to the end-user relative to other available services) for purposes known to the provider. Regardless of the reason, simply put, a cloud computing provider may have multiple regions of service.

Similar to the access to the cloud data center 114 in FIGS. 1-3, the cloud data center 400 is accessed via the edge router 112. From there, network traffic is routed via a connection 402A, 402B to the appropriate regional gateway hardware subgroup 404A, 404B, where the destination VPC(s) 406A, 406B is located. The connection 402A, 402B between edge router 112 and regional gateway hardware subgroup 404A, 404B, and connection 408A, 408B between regional gateway hardware subgroup 404A, 404B and VPC(s) 406A, 406B may be connection lines that implement VXLAN technology to reliably and securely transfer the network data. By using the VXLAN technology in combination with the load balancing, scalable gateway hardware group 404A, 404B, the end-user may be assured that the network communication between the private network and the VM(s) 410A, 410B of the VPC(s) 406A, 406B will not hit a bottleneck at the gateway. Note, however, that the end-user generally only pays for a predetermined amount of bandwidth. As such, it is possible that the end-user may try to transmit an amount of data that consumes more bandwidth than that for which the end-user pays. At such a point, the end-user would be restricted by a self-imposed limitation, but not by a limitation of the network's capabilities.

Moreover, as in FIG. 3, the regional gateway hardware subgroups 404A, and 404B in FIG. 4 may also be interconnected via a connection 412 such that an end-user may connect between distinct regional VPC(s) 406A and 406B, if desired when permitted. Connection 412 also may be connection line that implements VXLAN technology to transfer the network data.

Illustrative Example of Connecting a Private Network to a VPC

Figure 5:
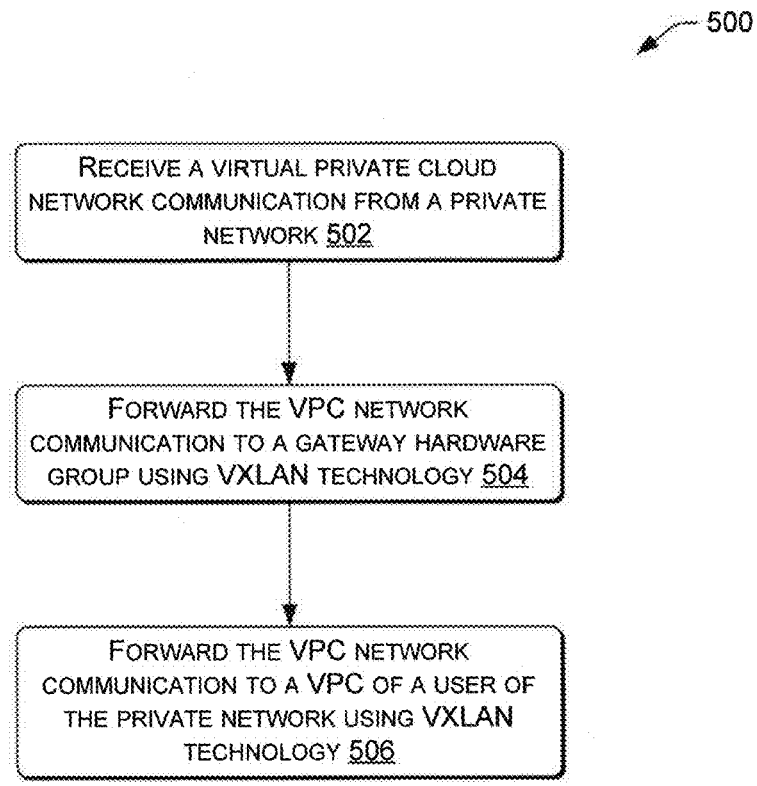
FIG. 5 illustrates a method of networking according to an example embodiment of this application.

Method 500 of FIG. 5 describes a process of connecting a private network to a VPC. In step 502, an edge router of a data cloud center receives a VPC communication from the private network. The communication may have been received from an intermediary service provider or directly from the private network. From the edge router of the data cloud center, the VPC communication may be forwarded in step 504 to a gateway hardware group (e.g., a regional gateway hardware subgroup) using a communication line that implements VXLAN tunneling technology.

To reach the desired VPC, in step 506, the VPC communication is forwarded from the gateway hardware group to the VPC of the user of the private network. Once again, the connection between the gateway hardware group and the VPC uses VXLAN tunneling technology.

Figure 6:
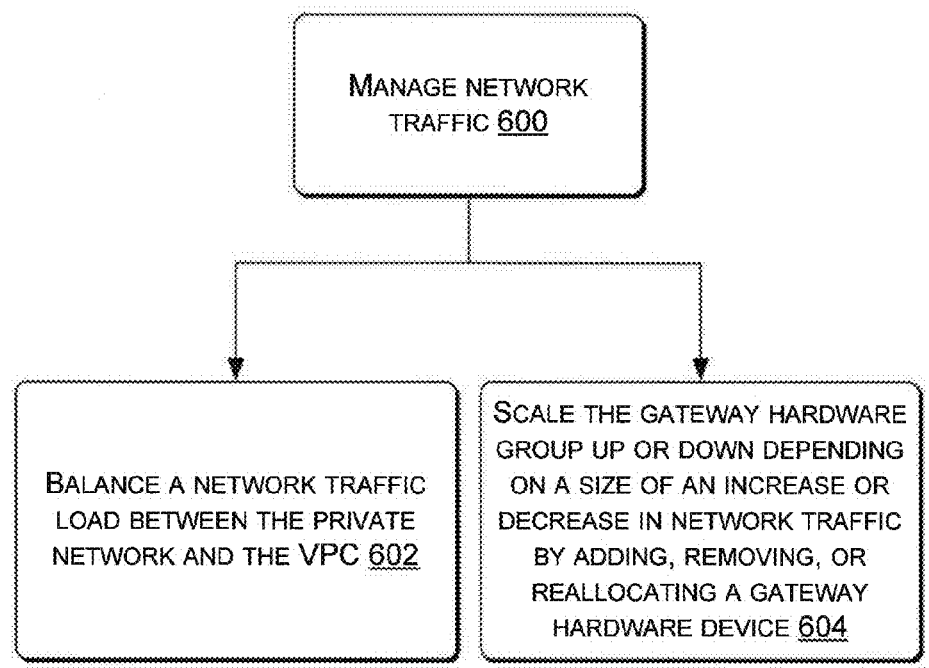
FIG. 6 illustrates a method of networking procedures according to an example embodiment of this application.

As network traffic of data increases, in order to avoid a bottleneck of data causing delays and errors in computing processes, the network traffic to the VMs in the VPC from the private network may be managed, as seen in FIG. 6, step 600. For example, the network traffic may be balanced, as indicated in step 602, among the multiple gateway servers in the associated gateway hardware group. Furthermore, in addition to or alternatively as necessary, the gateway hardware group may be scaled up or down in step 604. In particular, depending on the size of the increase or decrease in network traffic loads, the gateway hardware group may be scaled up in size or down in size to accommodate any changes, by adding, removing, or reallocating a gateway hardware server device.

In other words, if the network traffic from one or more end-users becomes greater than the capacity of a single gateway hardware server device to handle alone, and if the end-users have not maximized the bandwidth for which they are paying, then another gateway hardware server device in the gateway hardware group may balance the load and direct traffic to reduce the load on the primary gateway hardware device.

Similarly, if the network traffic from one or more end-users becomes greater than the capacity of a single gateway hardware group to handle alone, and if the end-users have not maximized the bandwidth for which they are paying, then the gateway hardware group may be easily scaled up by simply adding another gateway hardware server device the overloaded gateway hardware group. Thus, the added gateway hardware server device may balance the load and direct traffic.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. A networking method, comprising steps of:
receiving, at an edge router of a cloud data center, a virtual private cloud ("VPC") network communication from a private network via a dedicated physical connection line to the edge router;
forwarding the VPC network communication from the edge router to a gateway hardware group connected to the edge router via a first connection using Virtual Extensible Local Area Network ("VXLAN") technology; and
forwarding the VPC network communication from the gateway hardware group to a virtual machine ("VM") in a VPC of a user of the private network connected to the gateway hardware group via a second connection using VXLAN technology to access the VM,
wherein the gateway hardware group is partitioned into regional gateway hardware subgroups based on a geographic location of the regional gateway hardware subgroups, respectively, and
wherein the regional gateway hardware subgroups are linked via a logical connection via which a network traffic load is balanced among multiple regional gateway hardware subgroups.

2. The networking method according to claim 1, wherein the step of receiving the VPC network communication includes receiving the VPC network communication directly from a service provider of the private network via the dedicated physical connection line to the cloud data center.

3. The networking method according to claim 1, wherein the step of receiving the VPC network communication includes receiving the VPC network communication directly from a private router of the private network via the dedicated physical connection line to the cloud data center.

4. The networking method according to claim 1, further comprising scaling the gateway hardware group up or down depending on a size of an increase or decrease in the network traffic load, the scaling including adding, removing, or reallocating a gateway hardware device.

5. A networking system, comprising:
a private network connected via a dedicated physical connection line to an edge router of a cloud data center, the edge router being configured to receive a virtual private cloud ("VPC") network communication from the private network;
a gateway hardware group connected to the edge router via a first connection using Virtual Extensible Local Area Network ("VXLAN") technology, the gateway hardware group being configured to receive the VPC network communication from the edge router; and
a virtual machine ("VM") in a VPC of a user of the private network connected to the gateway hardware group via a second connection using VXLAN technology, the VM being configured to receive the VPC network communication from the gateway hardware group,
wherein the gateway hardware group is partitioned into regional gateway hardware subgroups based on a geographic location of the regional gateway hardware subgroups, respectively, and
wherein the regional gateway hardware subgroups are linked via a logical connection via which a network traffic load is balanced among multiple regional gateway hardware subgroups.

6. The networking system according to claim 5, wherein the dedicated physical connection line extends between a service provider of the private network to the cloud data center.

7. The networking system according to claim 5, wherein the dedicated physical connection line extends directly from a private router of the private network to the cloud data center.

8. The networking system according to claim 5, wherein the gateway hardware group includes a plurality of gateway hardware devices that balance the network traffic load between the private network and the VPC.

9. The networking system according to claim 8, wherein the gateway hardware group is configured to be scaled up or down depending on a size of an increase or decrease in the network traffic load, by adding, removing, or reallocating a gateway hardware device.

10. The networking system according to claim 5, wherein the first connection and the second connection are logical connections.

* * * * *